(12) United States Patent
Lingafelt et al.

(10) Patent No.: US 7,467,201 B2
(45) Date of Patent: Dec. 16, 2008

(54) METHODS, SYSTEMS AND COMPUTER PROGRAM PRODUCTS FOR PROVIDING STATUS INFORMATION TO A DEVICE ATTACHED TO AN INFORMATION INFRASTRUCTURE

(75) Inventors: Steven Lingafelt, Durham, NC (US); Gerald Marko, North Glenn, CO (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 10/647,269

(22) Filed: Aug. 22, 2003

(65) Prior Publication Data
US 2005/0044212 A1     Feb. 24, 2005

(51) Int. Cl.
*G06F 15/173*     (2006.01)

(52) U.S. Cl. ............... 709/224; 709/229; 713/1; 713/2; 713/100; 713/150; 726/3; 726/6; 726/22; 726/34

(58) Field of Classification Search ......... 709/223–225, 709/229; 713/1, 100, 150; 726/6, 22, 25, 726/34
See application file for complete search history.

(56) References Cited

U.S. PATENT DOCUMENTS

| 6,282,546 | B1 | | 8/2001 | Gleichauf et al. ........... 707/102 |
| 7,024,548 | B1 | * | 4/2006 | O'Toole, Jr. ................. 713/1 |
| 7,269,649 | B1 | * | 9/2007 | Brown et al. ................. 709/224 |
| 2002/0042886 | A1 | * | 4/2002 | Lahti et al. .................. 713/201 |
| 2002/0124181 | A1 | * | 9/2002 | Nambu ........................ 713/200 |
| 2002/0169879 | A1 | | 11/2002 | Jooste .......................... 709/227 |
| 2003/0065793 | A1 | * | 4/2003 | Kouznetsov et al. ........ 709/229 |
| 2003/0110398 | A1 | | 6/2003 | Dacier et al. ................ 713/201 |
| 2003/0126230 | A1 | | 7/2003 | Donatelli et al. ............ 709/217 |
| 2003/0200300 | A1 | * | 10/2003 | Melchione ................... 709/223 |

FOREIGN PATENT DOCUMENTS

WO     02/25438     3/2002

\* cited by examiner

*Primary Examiner*—Nathan Flynn
*Assistant Examiner*—Mohammad Siddiqi
(74) *Attorney, Agent, or Firm*—John R. Pivnichny; Dillon & Yudell LLP

(57) ABSTRACT

A method for providing status information to a device attached to an information technology infrastructure utilizing a device monitoring application resident at the device is disclosed. The device monitoring application utilizes signature data to monitor data associated with a device and selectively provide messages based on a correspondence between signature data and data associated with the device. A message signature is incorporated within the signature data. The data associated with the device is monitored by utilizing the device monitoring application so as to detect a presence of the message signature in the monitored data. A status message is provided by utilizing the device monitoring application if the presence of the message signature is detected in the monitored data. The signature data includes computer virus signatures and the message signature is not related to a computer virus.

21 Claims, 6 Drawing Sheets

METHODS, SYSTEMS AND COMPUTER PROGRAM PRODUCTS FOR PROVIDING STATUS INFORMATION TO A DEVICE ATTACHED TO AN INFORMATION INFRASTRUCTURE

FIELD OF THE INVENTION

The present invention relates to information technology, systems, methods and computer program products, and more particularly to providing information to devices attached to an information infrastructure.

BACKGROUND OF THE INVENTION

Administrators of information technology (IT) infrastructures may maintain registration information databases of equipment that are attached to the IT infrastructure. The registration information can be used in various ways, such as to evaluate the security of equipment and to track assets for tax purposes and compliance with privacy laws. However, if the registration database does not have complete information for all of the devices in the system, it may be difficult to identify the devices for which information is needed. For example, a relatively large business can have 100,000 to 500,000 devices or more that are each attached by an internet protocol (IP) to an internal IT infrastructure. The IT infrastructure administrators may not be able to identify the entity with control over a particular unregistered device in order to request that registration information be provided.

It may be difficult to communicate any information to the device, such as to request that registration be sent to an IT administrator. For example, in some cases, a communication may be received from an unregistered device. The communication may identify the IP address of the device, but it may contain little, if any, other identifying information. In an effort to find the device and/or entity with control over the device, the communication may be traced along a physical wire from the last known router, which can be identified using router tracing commands. The tracing of such communications may be problematic if the termination point of the wire and/or the device is in a security restricted space. Moreover, tracing a communication may not be practical in an environment with a relatively large number of devices.

SUMMARY OF THE INVENTION

In accordance with a preferred embodiment of the present invention, a device monitoring application utilizes signature data to monitor data associated with a device and selectively provides messages based on a correspondence between signature data and data associated with the device is monitored by utilizing the device monitoring application so as to detect a presence of the message signature in the monitored data. A status message is provided by utilizing the device monitoring application if the presence of the message signature is detected in the monitored data. The signature data includes computer virus signatures and the message signature is not related to a computer virus.

While embodiments according to the invention has been described above primarily with respect to the methods providing status information, both systems and/or computer program products are also provided.

DETAILED DESCRIPTION

Figure 1:
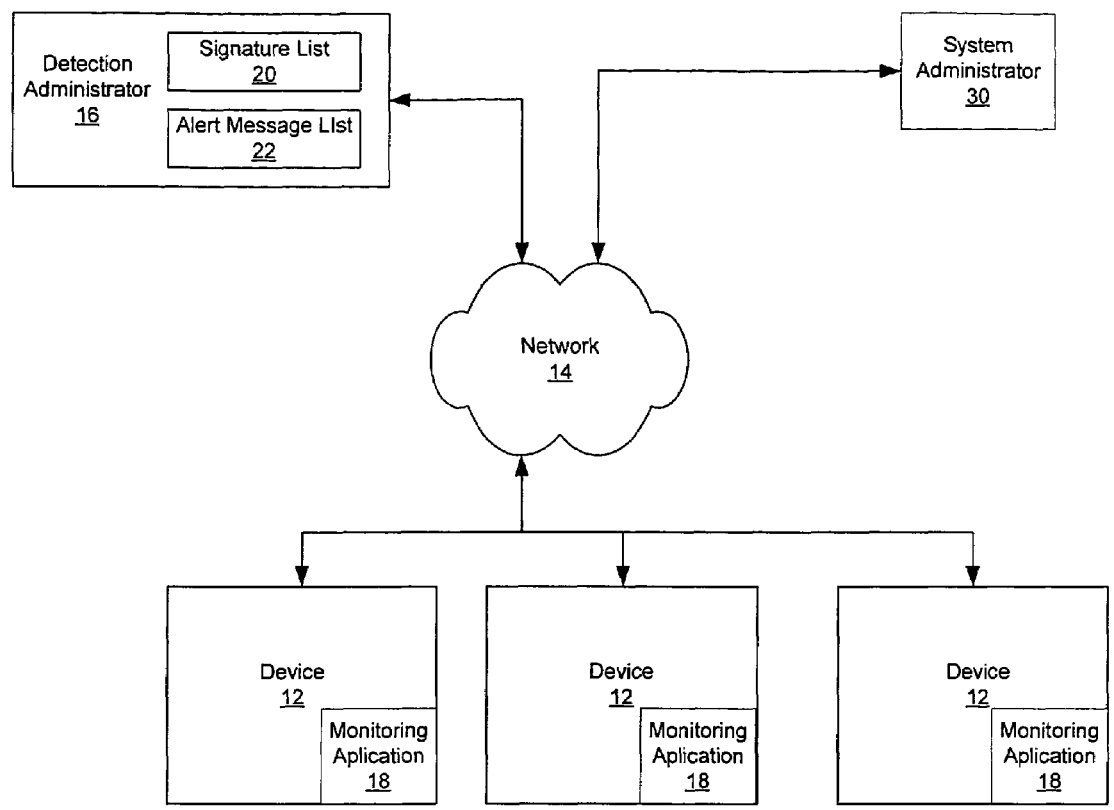
FIG. 1 is a block diagram of systems according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to particular embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, embodiments of the present invention provides communications to a device attached to an information technology (IT) infrastructure utilizing a device data monitoring application resident on the device. The device monitoring application utilizes signature data to monitor data associated with the device and selectively provides messages based on a correspondence between signature data and data associated with the device. According to some embodiments of the present invention, a message signature is incorporated in the signature data. Data associated with the device is monitored utilizing the device monitoring application so as to detect a presence of the message signature in the monitored data. A status message is provided utilizing the device monitoring application if the presence of the message signature is detected in the monitored data.

Various embodiments of the present invention will now be described with reference to FIGS. 1 through 7. FIG. 1 illustrates a network environment in which embodiments of the present invention may be utilized.

As seen in FIG. 1, data processing device(s) 12 may communicate over a network 14 to other data processing device(s) 12, detection administrator 16, and/or a system administrator 30. The network 14 may be an intranet or the Internet or other networks known to those of skill in the art. The device(s) 12, detection administrator 16, and the system administrator 30 can be any data processor or processing system, such as a personal computer, laptop computer, pervasive computing device such as a personal data assistant (PDA), smartphone, mobile terminals, stationary devices, and/or networked processing systems.

As shown in FIG. 1, the detection administrator 16 includes a signature list 20 and an alert message list 22, and the devices 12 include a device monitoring application 16. The signature list 20 can be a list of signature(s) that can be included in data, such as messages, electronic files, and applications. The signatures in the signature list 20 have a corresponding message from the alert message list 22. The detection administrator 16 can send the signature list 20 and the alert message list 22 to the device monitoring application 18 on each of the devices 12. Accordingly, if one of the device monitoring applications 18 detects one of the signatures from the signature list 20 in data associated with the device 12, then the corresponding message from the alert message list 22 is deployed. The alert message list 22 can include applications and/or scripts, such as applications for displaying "pop-up" messages or for performing an action.

The monitoring application 18 can be a security application, such as an antivirus application, a firewall application, health checking application or a host intrusion detection application. For example, if the monitoring application 18 is an antivirus application, the signature list 20 can include the signatures for various computer viruses, and the alert message list 22 can include messages and/or scripts responsive to the computer viruses, such as messages alerting a user that the virus exists and/or a script for repairing any damage caused by a virus or deleting the virus from the device 12. As another example, if the monitoring application 18 is a firewall or host intrusion application, the signature list 20 can include signatures that identify malicious or prohibited activity or define allowed traffic for the firewall or host intrusion detection application.

According to embodiments of the invention, the signature list 20 can include a message signature having a corresponding status message, such as an action message, an emergency message, a registration message, an instructional message or other communication messages, in the alert message list 22. The signature list 20 and the alert message list 22 may then be sent from the detection administrator 16 to the monitoring application 18 of the device(s) 12. The monitoring application 18 monitors the data on the device 12. If the message signature is detected by the monitoring application 18, then the status message is provided. For example, a message that includes the message signature can be received by one or more of the devices 12. When the message is received by a device 12, the respective monitoring application 18 detects the message signature and deploys the corresponding status message. In some embodiments, the status message can provide a request to a user of the device 12 or to the system administrator 30 to register the device 12. The status message can also provide instructions to register the device 12. In some embodiments, the status message can provide an emergency message, such as an evacuation message, a news report, or other information where timely delivery of a message may be desirable.

While embodiments of the present invention are illustrated, for example, with reference to a detection administrator 16, devices 12 and a system administrator 30, as will be appreciated by those of skill in the art, some operations according to embodiments of the present invention can be carried out by any one or more of the components of the network 14. For example, the detection administrator 16 can be omitted, and the signature list 20 and the alert message list 22 can be added to the devices 12 by an onsite user. Thus, the present invention should not be construed as limited to the configuration of FIG. 1 but is intended to encompass any configuration capable of carrying out the operations described herein.

Figure 2:
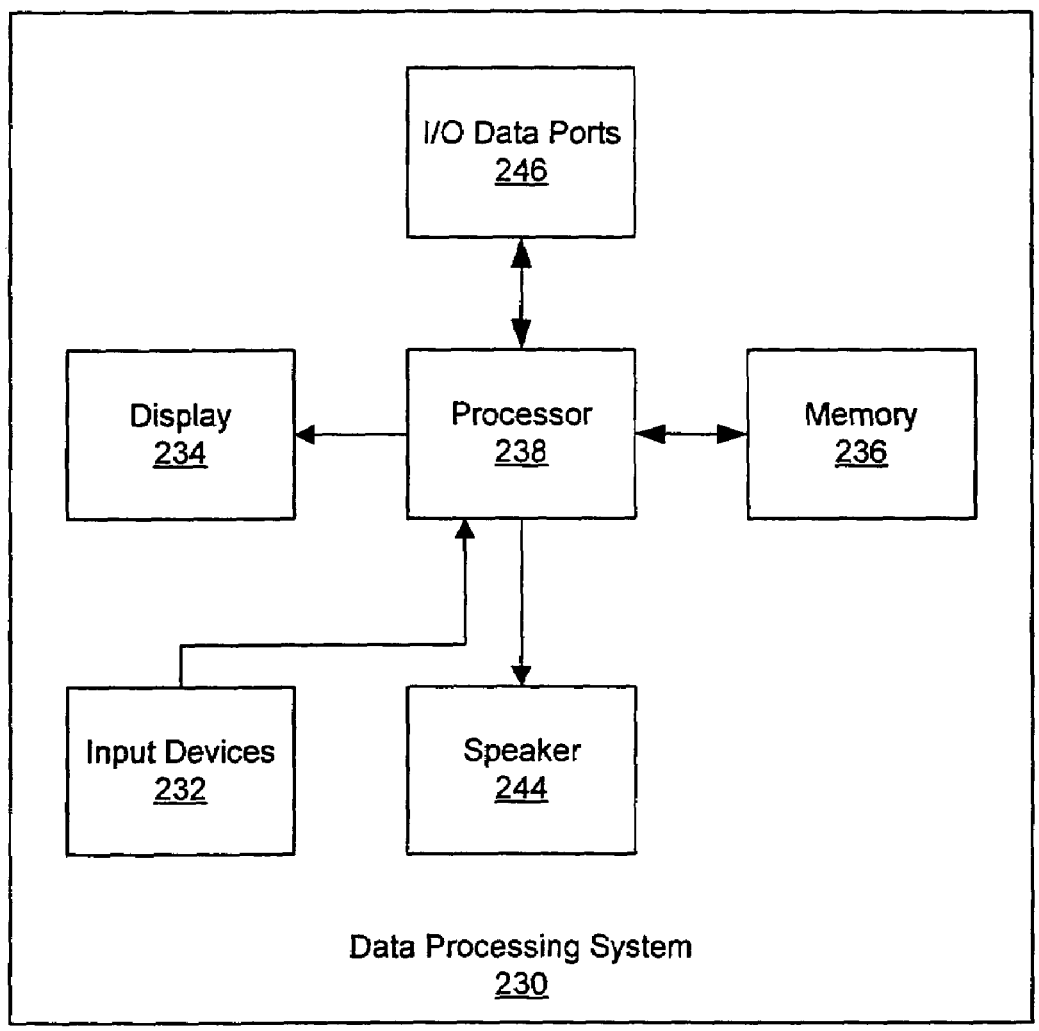
FIG. 2 is a block diagram of a data processing system according to embodiments of the present invention.

Referring to FIG. 2, exemplary embodiments of a data processing system 230 in accordance with embodiments of the present invention may include input device(s) 232 such as a keyboard or keypad, touch sensitive screen, light sensitive screen, or mouse, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems which may be configured to operate as described herein. Furthermore, as will be appreciated by those of skill in the art, the data processing system 230 may be configured as the device 12, the detection administrator 16 or the system administrator 30.

Figure 3:
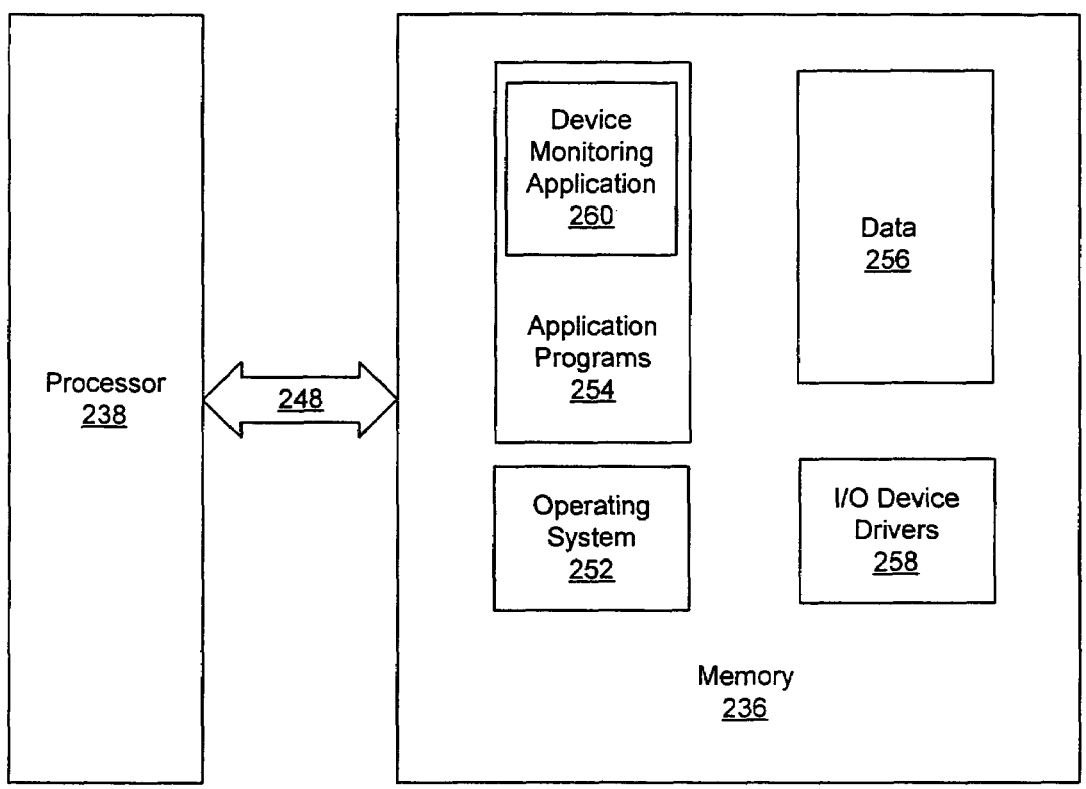
FIG. 3 is a block diagram of data processing systems according to embodiments of the present invention.

FIG. 3 is a block diagram of embodiments of data processing systems that illustrates systems, methods, and/or computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000, or WindowsXP from Microsoft Corporation, Redmond, Wash., Unix or Linux. The I/O device drivers 258 typically include software routines accessed through the operating system 252 by the application program 254 to communicate with devices such as the input devices 232, the speaker 244, the I/O data port(s) 246, and certain components of the memory 236. The application programs 254 are illustrative of the programs that implement the various features of the data processing system 230 and preferably include at least one application which provides the data transfer control aspects of embodiments of the present invention. Finally, the data 256 represents the static and dynamic data used by the application programs 254, the operating system 252, the I/O device drivers 258, and other software programs that may reside in the memory 236.

As is further seen in FIG. 3, the application programs 254 may include a device monitoring application 260. The device monitoring application 260 can carry out operations as described herein for monitoring data on a device.

While embodiments of the present invention are illustrated, for example, with reference to a device monitoring application 260, as will be appreciated by those of skill in the art, the device monitoring application 260 may also be incorporated into other components, such as the operating system 252. Thus, the present invention should not be construed as limited to the configuration of FIG. 3 but is intended to encompass any configuration capable of carrying out the operations described herein.

Figure 4:
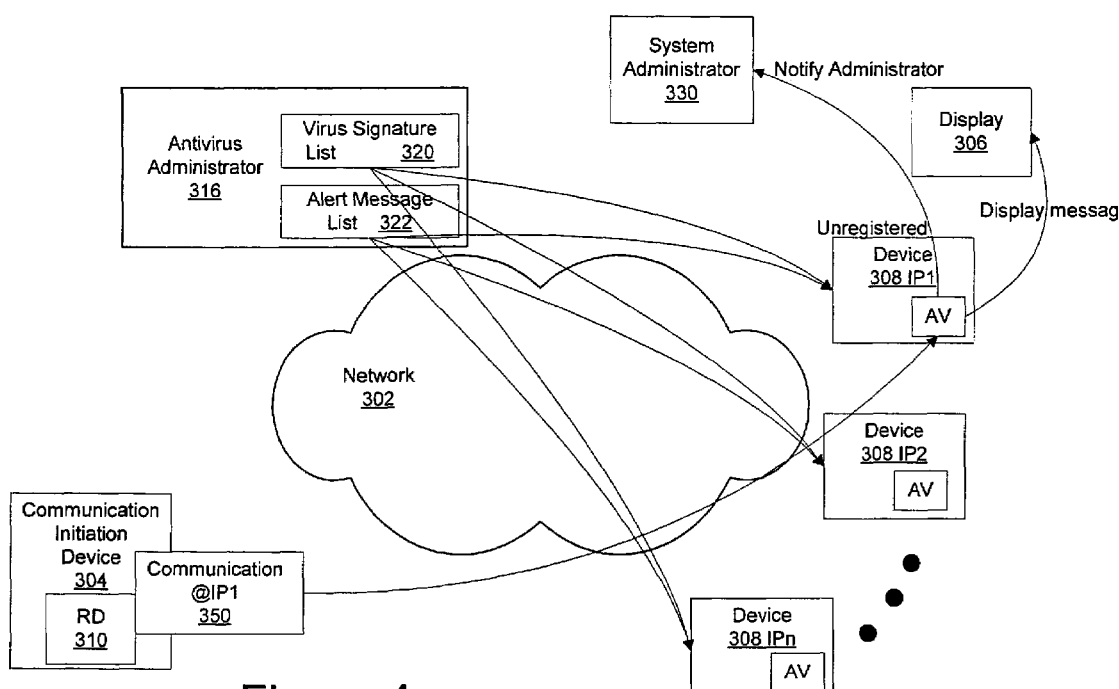
FIG. 4 is a block diagram of systems according to embodiments of the present invention.

Specific examples of a network environment in which embodiments of the present invention may be utilized in an antivirus system to register unregistered devices in an IT infrastructure is illustrated in FIG. 4. An antivirus administrator 316, a communication initiation device 304, a system administrator 330, and device(s) 308 having various IP addresses, IP1 to IPn, can communicate through network 302. The network 302 may be an intranet, the Internet and/or other networks known to those of skill in the art. The antivirus administrator 316, the communication initiation device 304, the system administrator 330, and the device(s) 308 can be any data processor or processing system, such as a personal computer, laptop computer, pervasive computing device such as a personal data assistant (PDA), smartphone, mobile terminals, stationary devices, and/or networked processing systems. One or more of the devices 308 can be configured to communicate by a display 306. For example, as shown in FIG. 4, the device 308 IP1 can communicate information to the display 306. The system administrator 330 can be the system administrator for one or more of the devices 308.

As illustrated in FIG. 4, the antivirus administrator 316 includes an antivirus signature list 320 and an associated alert message list 322. The antivirus signature list 320 can include signature(s) each having a corresponding message from the alert message list 322. The signatures can indicate the presence of a particular computer virus, such as a particular code or communication pattern. The alert message list 322 can include scripts and/or messages responsive to the detected virus. As shown in FIG. 4, the device(s) 308 include an antivirus application AV. The antivirus application AV monitors data associated with the respective device 308 to detect computer viruses. The signature list 320 and the alert message list 322, including computer virus signatures and corresponding message responsive to a detected virus, can be sent from the antivirus administrator 316 to the antivirus application AV. The antivirus application AV can utilize the antivirus signature list 320 to monitor data on the device 308 for virus signatures in the antivirus signature list 320.

According to embodiments of the present invention, the antivirus signature list 320 can further include a "virus" signature that can function as a message signature having an associated status message in the alert message list 322. The message signature and the associated status message are not related to a computer virus. Accordingly, the antivirus signature list 320 and the alert message list 322, including the message signature(s) and associated status message(s), can be sent from the antivirus administrator 316 to the antivirus application AV of the devices 308 through the network 302. If the antivirus application AV detects a message signature in data on the respective device 308 using the antivirus signature list 320, then the antivirus application AV deploys the corresponding status message. Accordingly, non-virus information can be sent to a device 308 using an antivirus system. In the example shown in FIG. 4, the status message is information related to the registration of a device, such as a request to register a device and/or instructions regarding how to register a device. However, other status messages may be used, including informational messages, emergency messages or other messages. The message signature can be a code, such as a particular bit pattern that can be recognized by the antivirus application AV using the signature list 320.

Although as shown in FIG. 4, the signature list 320 and the alert message list 322 are communicated to the antivirus application AV by the antivirus administrator, the signature list 320 and the alert message list 322 can be communicated to the antivirus application AV by any suitable method. For example, the signature list 320 and the alert message list 322 can be included into the memory of the device 308, such as by installation from a disk.

In the example shown in FIG. 4, the communication initiation device 304 includes a registration database 310. The registration database 310 includes registration information for some of the devices 308. However, the information in the registration database 310 may be incomplete. For example, as illustrated, device 308 IP1 is not registered in the registration database 310.

In some embodiments, the communication initiation device 304 can determine the IP address of the devices 308 that are not registered, for example, using a "ping" type application or other application to verify that an IP address exists on the network 302 and can accept requests. If a particular IP address exists on the network 302, the communication initiation device 304 can determine if the IP address exists in the registration database 310. If the IP address exists on the network 302 but is not contained in the registration database 310, then the device 308 corresponding to the IP address is not registered.

After the communication initiation device 304 determines that device 308 is not registered, it sends a communication 350 to the device 308 IP1 at its IP address, IP1. The communication 350 includes the message signature from the virus signature list 320. As discussed above, the signature list 320 and the alert message list 322 can be sent to the devices 308 by the antivirus administrator 316.

In the example shown in FIG. 4, the alert message is a status message including a message requesting device registration and/or instructions regarding how to register a device. After the communication 350 from the communication initiation device 304 is received by the antivirus application AV of the device 308 IP1, the antivirus application AV detects the message signature in the communication 350 by identifying the signature from the signature list 320 and the corresponding status message in the alert message list 322.

The status message from the alert message list 322 can then be deployed by the device 308 IP1. The status message can display a particular message on a display 306 and/or to notify the system administrator 330. For example, the antivirus application AV can be pre-configured to display a message on a display 306 and/or to notify the system administrator 330. The instructions to display a particular message can include program code for a "pop-up" type display window, e.g., a display window that automatically opens on a screen. Audio and/or visually displayed messages can be used. In some embodiments, the system administrator 330 can receive a message from the device 308 IP1 by an electronic mail message or other communication.

Although embodiments according to the invention have been described with respect to FIG. 4 with reference to antivirus administrator 316, a communication initiation device 304 and devices 308 including antivirus applications AV, other configurations can be used. For example, the display 306, the system administrator 330, and/or the antivirus administrator 316 can be provided as part of device 308 IP1. As another example, the functions of the communication initiation device 304 could be part of the antivirus administrator 318 and/or the devices 308. As discussed with respect to FIG. 1, any monitoring application can be used for the antivirus application AV, including firewall applications, host intrusion detection applications, and health checking applications.

Although the examples shown in FIG. 4 are described with respect to the registration of devices 308, in some embodiments, the registration functions can be omitted and communications that include the message signature in the signature data can be sent for purposes other than to obtain registration information. For example, a communication to initiate the display of an emergency message can be sent from devices other than the communication initiation device 308 to another device 308 or to all of the devices 308. Accordingly, a particular message can be enabled by its inclusion in the alert message list 322 and a corresponding code in the virus signature list 320. The message can then be triggered by sending the corresponding code to one or more of the devices 308.

Figure 5:
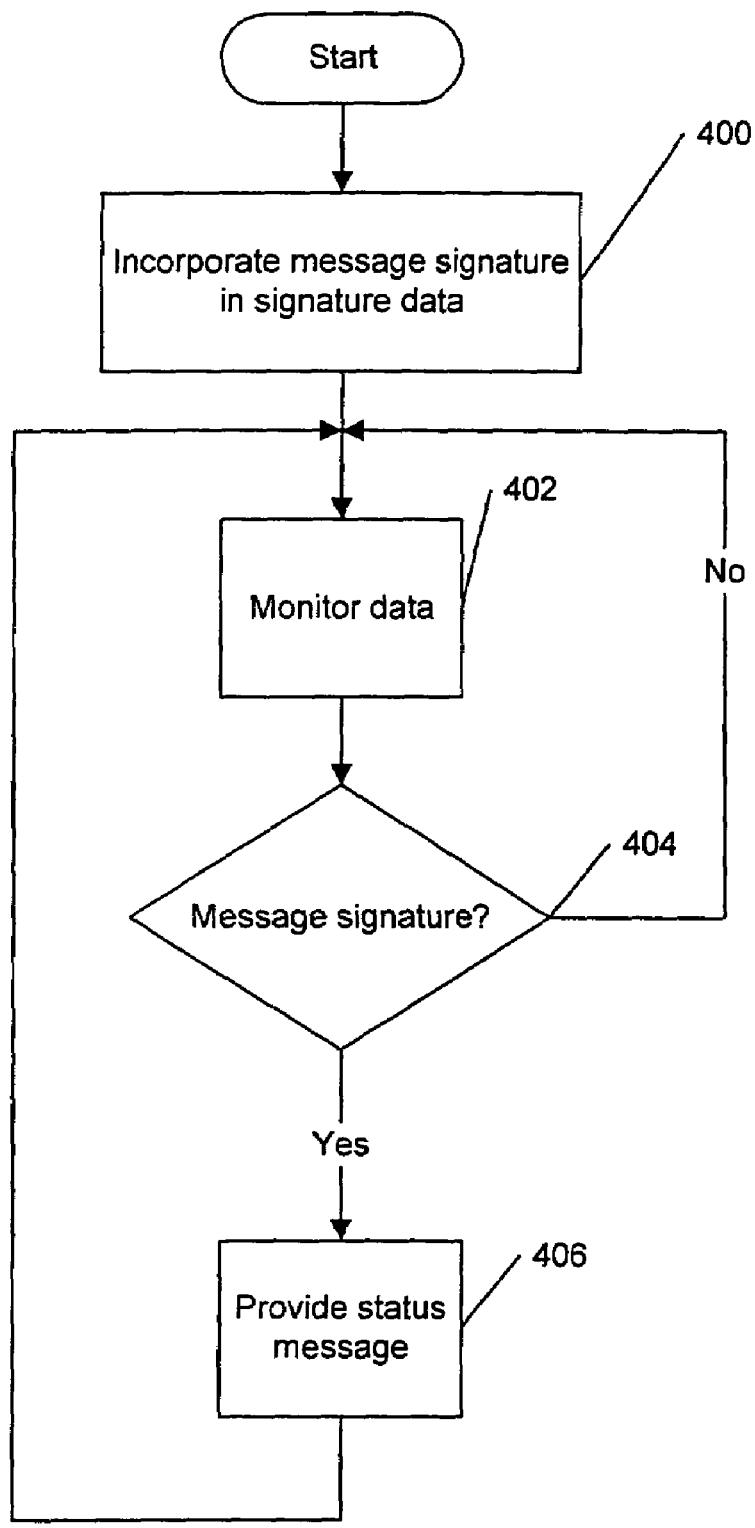
FIGS. 5-7 are flowcharts illustrating operations according to embodiments of the present invention.

Operations according to embodiments of the present invention will now be described with reference to FIGS. 5 through 8. As seen in FIG. 5, a message signature is incorporated in the signature data of a message (Block 400). The data is monitored (Block 402), and if the message signature is detected in the data (Block 404), then a status message is provided (Block 406). If the message signature is not detected (Block 404), then the data continues to be monitored (Block 402).

For example, in the exemplary network environment shown in FIG. 4, a communication including the message signature incorporated into signature data (Block 400)(FIG. 5) can be received by the device 308 IP1. The data on the device 308 IP1 is monitored (Block 402)(FIG. 5) by the antivirus application AV. If the message signature is detected (Block 404) by the antivirus application AV, then a status message is provided (Block 406).

Figure 6:
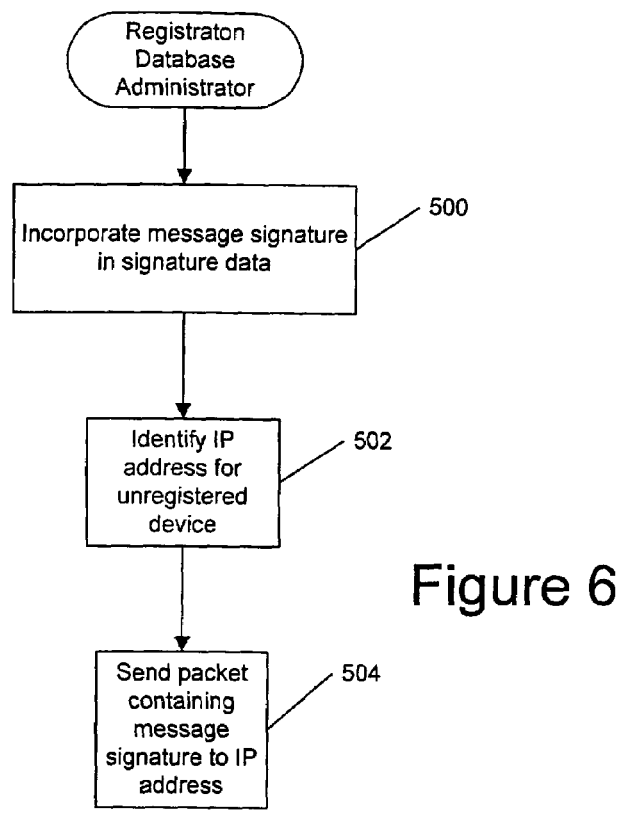
Figure 7:
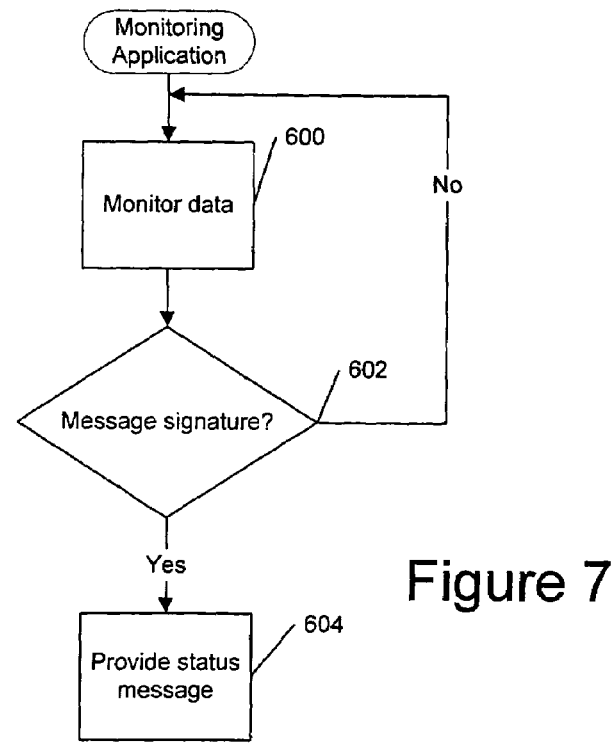

Operations according to further embodiments are shown in FIGS. 6 and 7. Referring to FIG. 6, a message signature can be incorporated into signature data (Block 500). The communication initiation device 304 (FIG. 4) can identify the IP address for unregistered device(s) (Block 502), for example, using a "ping" application to verify that an IP address exists. The communication initiation device 304 can then send a packet containing the message signature to the IP address (Block 504). Referring to FIG. 7, the device at the identified IP address to which the message is sent, e.g., device 308 IP1 (FIG. 4), monitors data on the device (Block 600), e.g., using a monitoring application, such as an antivirus application AV (FIG. 4) or other application, such as a firewall, host intrusion detection, or health check application. If the message signature is detected (Block 602), then the status message is provided (Block 606).

In the drawings and specification, there have been disclosed embodiments of the invention and, although specific terms are employed, they are used in a generic and descriptive sense only and not for purposes of limitation, the scope of the invention being set forth in the following claims.

That which is claimed:

1. A method for providing status information to a device attached to an information technology infrastructure utilizing a device monitoring application resident at the device, wherein the device monitoring application utilizes signature data to monitor data associated with the device and selectively provides messages based on a correspondence between signature data and data associated with the device, said method comprising:
   incorporating a message signature in the signature data;
   monitoring data associated with the device utilizing the device monitoring application so as to detect a presence of the message signature in the monitored data; and
   providing a status message utilizing the device monitoring application if the presence of the message signature is detected in the monitored data, wherein the signature data includes computer virus signatures and the message signature is not related to a computer virus.

2. The method of claim 1, further comprising identifying an internet protocol (IP) address for one or more devices that are not registered with the information technology infrastructure.

3. The method of claim 2, further comprising sending the message signature to the identified IP address.

4. The method of claim 1, wherein the device monitoring application comprises an antivirus application.

5. The method of claim 4, wherein the message signature comprises a non-virus communication.

6. The method of claim 1, wherein said providing a status message includes providing a request to register the device in the information technology infrastructure.

7. The method of claim 1, wherein providing a status message includes providing instructions to register the device in the information technology infrastructure.

8. The method of claim 1, wherein providing a status message includes providing an emergency message.

9. The method of claim 1, wherein the device monitoring application comprises an intrusion detection application.

10. The method of claim 1, wherein the device monitoring application comprises a firewall application.

11. The method of claim 1, wherein said monitoring data associated with the device includes monitoring incoming data received by the device.

12. A computer readable memory having a computer program product for providing status information to a device attached to an information technology infrastructure utilizing a device monitoring application resident at the device, wherein the device monitoring application utilizing signature data to monitor data associated with the device and selectively provides messages based on a correspondence between signature data and data associated with the device, the computer readable memory comprising:

computer program code that is configured to incorporate a message signature in the signature data;

computer program code that is configured to monitor data associated with the device utilizing the device monitoring application so as to detect a presence of the message signature in the monitored data; and computer program code that is configured to provide a status message utilizing the device monitoring application if the presence of the message signature is detected in the monitored data, wherein the signature data includes computer virus signatures and the message signature is not related to a computer virus.

13. The computer readable memory of claim 12, further comprising computer program code that is configured to identify an internet protocol (IP) address for one or more devices that are not registered with the information technology infrastructure.

14. The computer readable memory program product of claim 13, further comprising computer program code that is configured to send the message signature to the identified IP address.

15. The computer readable memory of claim 12, wherein the device data monitoring application comprises an antivirus application.

16. The computer readable memory of claim 15, wherein the message signature comprises a non-virus communication.

17. A system for providing status information to a device attached to an information technology infrastructure utilizes a device data monitoring application resident at the device, wherein the device monitoring application utilizing signature data to monitor data associated with the device and selectively provides messages based on a correspondence between signature data and data associated with the device, the system comprising: means for incorporating a message signature in the signature data;

means for monitoring data associated with the device utilizing the device monitoring application so as to detect a presence of the message signature in the monitored data; and means for providing a status message utilizing the device monitoring application if the presence of the message signature is detected in the monitored data, wherein the signature data includes computer virus signatures and the message signature is not related to a computer virus.

18. The system of claim 17, further comprising means for identifying an internet protocol (IP) address for one or more devices that are not registered with the information technology infrastructure.

19. The system of claim 18, further comprising means for sending the message signature to the identified IP address.

20. The system of claim 17, wherein the device monitoring application comprises an antivirus application.

21. The system of claim 20, wherein the message signature comprises a non-virus communication.

* * * * *